(No Model.)

T. GOODENOUGH.
PNEUMATIC DOOR CHECK.

No. 393,430. Patented Nov. 27, 1888.

Witnesses.
K. C. Bruman.
Maurice J. Roach.

Inventor.
Thomas Goodenough
By his attorneys
Gifford & Brown.

United States Patent Office.

THOMAS GOODENOUGH, OF WOODSIDE, ASSIGNOR TO THE AKBAR MANUFACTURING COMPANY, OF NEW YORK, N. Y.

PNEUMATIC DOOR-CHECK.

SPECIFICATION forming part of Letters Patent No. 393,430, dated November 27, 1888.

Application filed May 9, 1888. Serial No. 273,326. (No model.)

*To all whom it may concern:*

Be it known that I, THOMAS GOODENOUGH, of Woodside, Queens county, in the State of New York, have invented a new and useful Improvement in Door-Checks, of which the following is a specification.

I will describe a door-check embodying my improvement, and then point out the novel features in claims.

Figure 1:
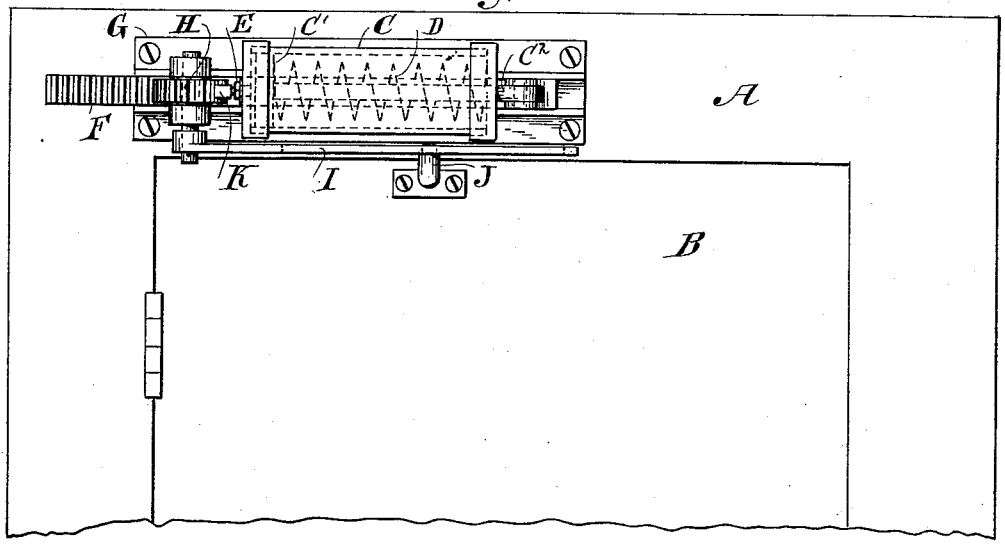
Figure 2:
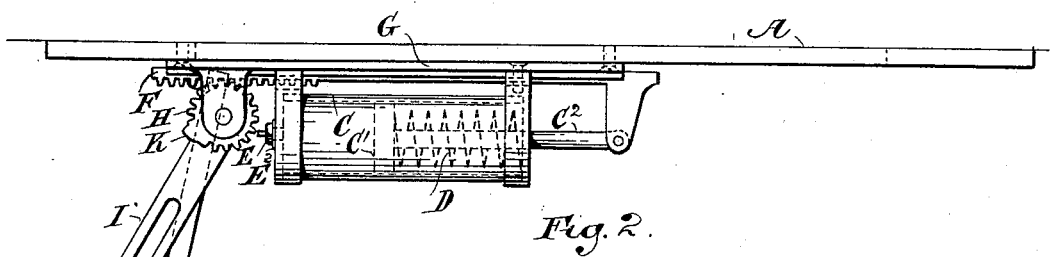
Figure 3:
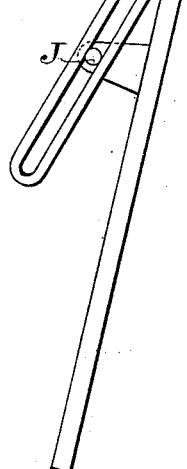

In the accompanying drawings, Figure 1 is a view of the upper part of a door-casing and the corresponding portion of a door, also an elevation of a door-check embodying my improvement combined therewith. Fig. 2 is a top view of the door-check. This view also includes a representation of the door casing and door. Fig. 3 is a detailed view of a valve and appurtenances.

Similar letters of reference designate corresponding parts in all the figures.

A designates the upper portion of a door-casing.

B designates the corresponding portion of a door, connected by hinges $b$ to one side of the door-casing.

C designates a cylinder fitted with a piston, $C'$, which has a rod, $C^2$, extending through one end of the cylinder.

D designates a spring arranged with the cylinder. It is shown as coiled around the piston-rod and as located between the piston and that end of the cylinder through which the piston-rod passes. The other end of the cylinder (I mean the one through which the piston-rod does not pass) is provided with a valve, E. When the piston moves away from the valve E, the latter opens inwardly and admits air behind the piston. When the piston moves toward the valve, the valve closes and prevents the escape of air past it. The piston moves away from the valve during the opening of the door B. It moves toward the valve during the closing of the door. While the piston is moving toward the valve it compresses the air forward of it, so that an air-cushion will be formed. This air-cushion will resist the movement of the piston and the closing of the door. In this way the closing of the door is rendered slow and easy.

The valve E is located at the valve chamber $E'$. This is made in the form of a hollow screw, the shank of which enters and engages with a tapped hole in the cylinder head or end. The valve has a stem extending outwardly through the head of the screw, forming the valve-chamber. Between the head of the screw and the head or end of the cylinder in which the shank of the screw is inserted a washer, $E^2$, is arranged. This washer may be made of soft leather or other soft material capable of being compressed more or less by turning the screw and causing its head to approach or recede from the cylinder end. When the piston is moving toward the valve, air can escape around the shank of the screw, because the shank of the screw is made to fit the tapped hole in the cylinder end sufficiently loose to admit of the escape of air. The air can also escape past the washer $E^2$, and with a facility depending upon the degree to which the washer is compressed. By increasing or decreasing the compression of the washer the freedom with which air can escape may be varied.

So far as I have already explained the door-check I do not here lay claim to any of its parts.

I will now explain the novel features of my present improvement, and in doing so will also describe the manner in which the actions of the pneumatic cylinder and piston will act upon the door.

F designates a rack-bar arranged in a guideway in a base-plate, G, to which the cylinder is secured. This base-plate is provided with hollows for the reception of screws, whereby it may be secured to a door-casing or door. It is shown as secured to a door-casing. At one end of this rack-bar is secured the end of the piston-rod, which protrudes through the cylinder. The rack-bar and piston therefore move in unison.

H designates a gear-wheel journaled in brackets extending from the base-plate, and having a lever, I, in operative engagement with it. This lever is connected with a door-casing or door—in the present instance to a door. I have shown this connection as consisting of a pin or stud, J, secured to the upper part of the door and entering the longitudinal slot in the lever.

When the door is open, the lever I will be oscillated, the gear-wheel H will be partially rotated, and the rack-bar F will be moved longitudinally in such direction as to cause the piston to move away from that end of the cylinder in which the valve E is located. As soon as the door is released the spring D will force the piston, and consequently the rack-bar, in the reverse direction, the rack bar will rotate the wheel H, the lever I will be oscillated, and the door B will be closed. The air-cushion formed in advance of the piston will check the movement of all the parts, rendering the movement so slow that the door will close slowly and softly.

I have shown the wheel H as carrying a tappet or cam, K, which, when the door is almost closed, will contact with the stem of the valve E, force the valve inwardly, and relieve the cylinder of excessive air-pressure, so that the door can close more quickly at the end of its movement than otherwise would be possible.

It will be seen that this door-check is very simple and compact, little liable to get out of order, and capable of very efficient action.

What I claim as my invention, and desire to secure by Letters Patent, is—

1. In a door-check, the combination of a pneumatic cylinder, a piston operating therein, a bar arranged parallel with the piston-rod and connected thereto, a lever engaging with said bar, and mechanism, substantially as described, connecting said lever and bar.

2. In a door-check, the combination of a pneumatic cylinder, a piston fitted within said cylinder and having a rod supported in a bearing at one end portion of the cylinder, a spring arranged between the piston and one end portion of the cylinder, a valve at the other end portion of the cylinder, a rack-bar arranged parallel with the piston-rod and connected to the piston-rod, a gear-wheel arranged outside the cylinder and engaging with the rack-bar, and a lever affixed to the gear-wheel, substantially as specified.

3. In a door-check, the combination of a pneumatic cylinder, a piston operating therein, a bar arranged parallel with the piston-rod and connected thereto, a lever engaging with said bar, and mechanism, substantially as described, connecting said lever and bar, a valve arranged in said cylinder and having a stem protruding through the cylinder, and a cam or tappet arranged to be operated by the door and serving to open said valve, substantially as described.

4. In a door-check, a pneumatic cylinder, a valve arranged in said cylinder, and having a stem that protrudes through the cylinder, a lever, and a rotary cam moved by said lever and serving to open said valve, all substantially as specified.

THOMAS GOODENOUGH.

Witnesses:
CHARLES O. KEMP,
EDWIN H. BROWN.